United States Patent
Wu et al.

(10) Patent No.: US 9,127,177 B2
(45) Date of Patent: Sep. 8, 2015

(54) WATER-BASED INK FOR COMPUTER-TO-PLATE INKJET PRINTING AND PREPARATION METHOD THEREFOR

(75) Inventors: Wei Wu, Beijing (CN); Haihua Zhou, Beijing (CN); Yanlin Song, Beijing (CN)

(73) Assignee: Institute of Chemistry, Chinese Academy of Sciences, Beijing (CN)

( * ) Notice: Subject to any disclaimer, the term of this patent is extended or adjusted under 35 U.S.C. 154(b) by 0 days.

(21) Appl. No.: 14/343,613

(22) PCT Filed: Sep. 7, 2012

(86) PCT No.: PCT/CN2012/081103
§ 371 (c)(1),
(2), (4) Date: Mar. 7, 2014

(87) PCT Pub. No.: WO2013/034096
PCT Pub. Date: Mar. 14, 2013

(65) Prior Publication Data
US 2014/0216300 A1  Aug. 7, 2014

(30) Foreign Application Priority Data
Sep. 8, 2011  (CN) .......................... 2011 1 0265646

(51) Int. Cl.
| | | |
|---|---|---|
| C09D 11/02 | (2014.01) | |
| C09D 11/03 | (2014.01) | |
| C09D 11/328 | (2014.01) | |
| C09D 11/10 | (2014.01) | |
| C09D 11/30 | (2014.01) | |

(52) U.S. Cl.
CPC ................ *C09D 11/03* (2013.01); *C09D 11/10* (2013.01); *C09D 11/30* (2013.01); *C09D 11/328* (2013.01)

(58) Field of Classification Search
CPC ........ C09D 11/10; C09D 11/30; C09D 11/03; C09D 11/328
USPC ...................... 106/31.58, 31.86, 31.59, 31.89
See application file for complete search history.

(56) References Cited

U.S. PATENT DOCUMENTS

| 5,139,574 A | 8/1992 | Winnik et al. |
| 7,201,795 B2* | 4/2007 | Takemoto et al. .......... 106/31.86 |
| 2008/0171149 A1* | 7/2008 | Hastie ............................ 427/288 |
| 2010/0279035 A1* | 11/2010 | Namba et al. ............... 428/32.21 |

FOREIGN PATENT DOCUMENTS

| CN | 1803945 | 7/2006 |
| CN | 101054489 | 10/2007 |
| CN | 101081952 A | 12/2007 |
| CN | 102002281 | 4/2011 |
| CN | 102031039 | 4/2011 |
| CN | 102134421 | 7/2011 |

* cited by examiner

*Primary Examiner* — Veronica F Faison
(74) *Attorney, Agent, or Firm* — Volpe and Koenig, P.C.

(57) ABSTRACT

A water-based ink for use in a computer-to-plate inkjet printing and a preparation method therefor. A polymer of 5 to 40 wt %, an additive of 0.01 to 10 wt %, a dye or pigment of 0.01 to 10 wt %, an organic solvent of 1 to 30 wt %, an anti-foaming agent of 0 to 5 wt %, and deionized water are stirred and mixed at room temperature. When the polymer is dissolved, the mixed solution is filtered. The filtrate is the water-based ink. The water-based ink is sprayed via a computer-to-plate machine onto a surface of a metal substrate (which may be an aluminum plate, a zinc plate, or a copper plate) to form a graphic region. A printing plate allowing for computer-to-plate printing is acquired after solidification. The printing plate acquired is allowed to achieve a halftone dot reproduction rate between 2 and 99% and a recognition rate of 175 lpi.

14 Claims, No Drawings

WATER-BASED INK FOR COMPUTER-TO-PLATE INKJET PRINTING AND PREPARATION METHOD THEREFOR

This application is a 35 U.S.C. §371 national stage application of PCT/CN2012/081103, which was filed Sep. 7, 2012 and claims the benefit of CN201110265646.9, filed Sep. 8, 2011, both of which are incorporated herein by reference as if fully set forth.

TECHNICAL FIELD OF THE INVENTION

The invention belongs to a water-based ink for platemaking, in particular to a high resolution water-based ink for a computer-to-plate inkjet printing technology and a preparation method therefor.

BACKGROUND OF THE INVENTION

Computer-to-plate inkjet printing technology is a platemaking technology utilizing an inkjet printer to spray platemaking ink onto a surface of a metal substrate or a polymer substrate to form an oleophilic graphic region, while the unsprayed region is a hydrophilic non-graphic region, thereby realizing printing through the hydrophilic and oleophilic contrast between the graphic region and the non-graphic region. By adopting the computer-to-plate inkjet printing technology, the post treatments such as exposing and developing are avoided, and the obtained printing plate allowing for computer-to-plate inkjet printing is good in resolution and press run. At present, most of the ink for the computer-to-plate inkjet printing is eco-solvent ink, when being used, the eco-solvent ink is easy to block the nozzle of printer, and the toxic and harmful gases produced in curing will pollute the environment. Water-based ink is good in printing smoothness, no toxic gas is released when curing, and meanwhile, through adjusting the concentration and compositions of the water-based ink, good image resolution and higher press run will be realized.

At present, the water-based ink for inkjet printing is mainly applied in plain paper or the paper with diffusion-resistant coating, films and various fiber-based substrates. Computer-to-plate inkjet printing technology adopts metal substrate, requires that the diffusion of the water-based ink on metal substrates can be effectively controlled, and meanwhile, enables to ensure the hydrophilic and oleophilic contrast between the graphic area and the non-graphic area, thereby realizing good image resolution and press run when performing computer-to-plate inkjet printing.

Currently, among the quick-drying water-based inks used for inkjet printing, in the computer-to-plate inkjet printing technology launched by Israel VIM Company, the adopted ink is standard Epson water-based ink; however, such water-based ink is very expensive.

SUMMARY OF THE INVENTION

The invention aims to provide a high resolution water-based ink for computer-to-plate inkjet printing technology, so as to avoid the eco-solvent ink blocking the nozzle of the printer when performing computer-to-plate inkjet printing.

The invention further aims to provide a method for preparing a high resolution water-based ink for computer-to-plate inkjet printing technology.

The high resolution water-based ink for computer-to-plate inkjet printing of the present invention comprises polymer, additive, dye or pigment, organic solvent, anti-foaming agent and deionized water; the water-based ink is sprayed via a computer-to-plate inkjet printer onto a surface of a metal substrate (wherein the metal substrate may be an aluminum substrate, a zinc substrate, or a copper substrate) to form a graphic region, then a printing plate allowing for computer-to-plate inkjet printing is achieved after curing.

The water-based ink for computer-to-plate inkjet printing according to the invention, based on the total amount of the water-based ink, the water-based ink comprises:
- 5 to 40 wt % (preferably 10-30 wt %) of polymer,
- 0.01 to 10 wt % (preferably 0.1-5 wt %) of additive,
- 0.01 to 10 wt % (preferably 0.05-5 wt %) of dye or pigment,
- 1 to 30 wt % of organic solvent,
- 0 to 5 wt % (preferably 0.01-5 wt %) of anti-foaming agent, and
- balance of deionized water.

The polymer is at least one selected from the group consisting of polyurethane resin, epoxy resin, water-soluble phenolic resin, polyvinyl alcohol, polyvinyl pyrrolidone, polyethylene glycol, gelatin, gum arabic, polyacrylic acid resin, alkyd resin, polymethacrylic acid resin, copolymer of acrylic acid and acrylate-based monomer, copolymer of methacrylic acid and methacrylate-based monomer, polyvinyl acetal and water-soluble cellulose.

The polyurethane resin may be the ordinary resin obtained by condensing isocyanate and hydroxyl-containing compound, the isocyanate and the hydroxyl-containing compound may be the routine selection in the art. For example, the isocyanate may be at least one selected from the group consisting of toluene diisocyanate, isophorone diisocyanate, p-phenylene diisocyanate, methyl cyclohexyl diisocyanate and 1,4-cyclohexane diisocyanate. The hydroxyl-containing compound may be at least one selected from the group consisting of polycarbonate diol, polyether triol, polyether diol (such as polyoxypropylene glycol, polyoxybutylene glycol, polypropylene glycol and polyethylene glycol), polyester diol and polyacrylate polyols.

The epoxy resin may be ordinary epoxy resins, and there is no particularly limit. For example, the epoxy resin may be glycidyl ether epoxy resin, glycidyl ester epoxy resin, glycidyl amine epoxy resin, linear aliphatic epoxy resin or cycloaliphatic epoxy resin.

There is no particular limit for the relative proportions of the structural unit formed by acrylic acid and the structural unit formed by acrylate-based monomer in the copolymer of acrylic acid and acrylate-based monomer. Generally, in the copolymer of the acrylic acid and acrylate-based monomer, the weight ratio of the structural unit formed by acrylic acid to the structural unit formed by acrylate-based monomer may be in a range of 1:1-15. In the present invention, the copolymer of acrylic acid and acrylate-based monomer may be a random copolymer, or a block copolymer, and there is no particular limit.

In the present invention, there is no particular limit for the relative proportions of the structural unit formed by methacrylic acid and the structural unit formed by methacrylate-based monomer in the copolymer of methacrylic acid and methacrylate-based monomer. Generally, in the copolymer of methacrylic acid and methacrylate-based monomer, the weight ratio of the structural unit formed by methacrylic acid to the structural unit formed by methacrylate-based monomer may be in a range of 1:1-15. In the present invention, the copolymer of methacrylic acid and methacrylate-based monomer may be a random copolymer, or a block copolymer, and there is no particular limit.

The acrylate-based monomer may be at least one selected from the group consisting of methyl acrylate, ethyl acrylate, propyl acrylate, n-butyl acrylate, lauryl acrylate, octadecyl acrylate and 2-ethyl hexyl acrylate.

The methacrylate-based monomer may be at least one selected from the group consisting of methyl methacrylate, butyl methacrylate, 2-phenoxy ethyl methacrylate and glycidyl methacrylate.

The additive may be additive able to reduce the surface tension, such as organic silicone-based leveling agent and/or organic fluorine-based leveling agent.

The organic silicone-based leveling agent may be at least one selected from the group consisting of polydimethylsiloxane, polyphenylmethylsiloxane, polyether-modified silicone (such as copolymer of polyether and organic silicone, and the specific example may include but not limit to polyether-modified polydimethylsiloxane) and polyester-modified silicone (such as copolymer of polyester and organic silicone).

The organic fluorine-based leveling agent may be at least one selected from the group consisting of fluorine-containing acrylic resin (such as acrylic resin in the molecular structure of which hydrogen atoms are substituted by fluorine atoms, and acrylic resin in the molecular structure of which hydrogen atoms are substituted by fluorine-containing hydrocarbyl, the fluorine-containing hydrocarbyl is preferably fluorine-containing alkyl, more preferably $C_1$-$C_5$ fluorine-containing alkyl, and further preferably $CF_3$—) and fluorine-containing polyether-based leveling agent.

When using the leveling agent, the anti-foaming agent may be used at the same time. The anti-foaming agent may be at least one selected from the group consisting of nature oils, polyether and higher alcohols. In the present invention, the higher alcohols means aliphatic alcohols with a carbon number of 10 or more (such as 10-30).

The polyether may be at least one selected from the group consisting of ordinary polyether such as polyether F-68, polyether 3050, polyether L-61, polyether L-68, polyether 204, polyether P-65, polyether 3010, polyether F-38 and polyether L-64.

The dye may be one selected from the group consisting of active dye, acidic dye and basic dye.

The active dye may be one selected from the group consisting of black dye SP series and active black.

The acidic dye may be one selected from the group consisting of dye acidic blue and dye acidic yellow.

The basic dye may be one selected from the group consisting of the basic brilliant blue and Victoria blue.

The dye acidic blue may be one selected from the group consisting of acidic blue 9, acidic blue 25, acidic blue 40, acidic blue 62, acidic blue 324, acidic blue AS, acidic blue AGG, acidic blue 2BR and acidic blue BR.

The dye acidic yellow may be one selected from the group consisting of dye acidic yellow 3, dye acidic yellow 23, dye acidic yellow 49, dye acidic yellow 127 and dye acidic yellow 6G.

The pigment may have a particle size of 5-1000 nm. The ink added with the pigment is required to be ground in a mill until the particles are dispersed steadily. The pigment may be one selected from the group consisting of pigment yellow, pigment orange, pigment red, pigment purple, pigment blue, pigment green, pigment brown, pigment black, pigment white and metal pigment.

The organic solvent may be at least one selected from the group consisting of ethanol, propanol, isopropanol, n-butanol, teat-butanol, acetonitrile, tetrahydrofuran, 1,4-dioxane, dimethylsulfoxide, N,N-dimethylformamide, ethylene glycol ethyl ether (such as ethylene glycol monoethyl ether and ethylene glycol diethyl ether), propylene glycol methyl ether (such as propylene glycol monomethyl ether and propylene glycol dimethyl ether), propylene glycol ethyl ether (such as propylene glycol monoethyl ether and propylene glycol diethyl ether), diethylene glycol methyl ether (such as diethylene glycol monomethyl ether and diethylene glycol dimethyl ether), ethylene glycol mono-n-butyl ether, ethylene glycol dimethyl ether, propylene glycol isopropyl ether (such as propylene glycol mono-isopropyl ether and propylene glycol di-isopropyl ether), propylene glycol momobutyl ether, propylene glycol dibutyl ether, diethylene glycol monoethyl ether, diethylene glycol diethyl ether, diethylene glycol monobutyl ether, dipropylene glycol monomethyl ether, dipropylene glycol dimethyl ether, dipropylene glycol diethyl ether, dipropylene glycol dipropyl ether, dipropylene glycol monoethyl ether, dipropylene glycol monobutyl ether, triethylene glycol monoethyl ether, triethylene glycol momobutyl ether, tripropylene glycol monomethyl ether, ethylene glycol, propylene glycol, glycerol, diethylene glycol and triethylene glycol.

The conductivity of the deionized water may be less than 10 micro Siemens/cm.

The method for preparing the high resolution water-based ink for computer-to-plate inkjet printing of the present invention comprises the following steps: based on the total amount of the water-based ink, mixing polymer in an amount of 5-40 wt % (preferably 10-30 wt %), additive in an amount of 0.01-10 wt % (preferably 0.1-5 wt %), dye or pigment in an amount of 0.01-10 wt % (preferably 0.05-5 wt %), organic solvent in an amount of 1-30 wt %, anti-foaming agent in an amount of 0-5 wt % (preferably 0.01-5 wt %), and deionized water in balance by stirring at room temperature (such as 15-35° C.), when the polymer is completely dissolved, filtering the mixed solution, and obtaining filtrate is the water-based ink for computer-to-plate inkjet printing of the present invention.

The filter may adopt multi-stage filter. The multi-stage filter may adopt a filter membrane to filter the mixed solution for many times, or adopt a sand core funnel and a filter membrane to filter the mixed solution in sequence, and preferably adopt the sand core funnel and the filter membrane to filter the mixed solution in sequence. Specifically, filtering the mixed solution with the sand core funnel, and then filtering with the micron pore-sized filter membrane, and the obtained filtrate is the water-based ink of the present invention.

As for the filter by the sand core funnel, the preferred filtering scheme is to adopt a glass sand core funnel with a pore size of 20-30 microns (G1-type glass sand core funnel) to perform the filter firstly, and then adopt a glass sand core funnel with a pore size of 3-4 microns (G4-type glass sand core funnel) to perform the filter.

As for the filter by the micron pore-sized filter membrane, the preferred filtering scheme is to adopt a polytetrafluoroethylene micro-porous membrane with a pore size of 0.3-0.5 micron to perform the filter firstly, and then adopt a polytetrafluoroethylene micro-porous membrane with a pore size of 0.15-0.25 micron to perform the filter.

The high resolution water-based ink for computer-to-plate inkjet printing according to the present invention can be sprayed onto the surface of metal substrate through an inkjet printer controlled by computer (such as CTP7600 plate-making system (see CN1800982A)) to form a graphic region, and then, the printing plate allowing for computer-to-plate inkjet printing is achieved after curing. The obtained printing plate is good in resolution, and the obtained printing plate is allowed to achieve a halftone dot reproduction rate between 2 and 99% and a resolution of 175 lpi. The high resolution water-based ink for computer-to-plate inkjet printing according to the present invention is low in cost, and thus, the computer-to-plate inkjet printing technology can be easily popularized.

DETAILED DESCRIPTION OF THE EMBODIMENTS

Example 1

Based on the total amount of the high resolution water-based ink, 5 wt % of polyurethane resin (purchased from Yantai Wanhua Polyurethane Co., Ltd with a trademark of WANNATE PM-2025), 0.01 wt % of polyether-modified polydimethylsiloxane (purchased from BYK Chemie with a trademark of BYK-331), 0.01 wt % of basic brilliant blue, 1 wt % of isopropanol, 5 wt % of natural oils and balance of deionized water are mixed by stirring at room temperature for 2 hours. After the mixed solution is filtered, the obtained filtrate is the water-based ink.

Example 2

Based on the total amount of the high resolution water-based ink, 40 wt % of polyurethane resin (purchased from Yantai Wanhua Polyurethane Co., Ltd with a trademark of WANNATE PM-2025), 10 wt % of polydimethylsiloxane (purchased from Guangzhou Silok Chemical Co., Ltd. with a trademark of Silok® 201-100), 30 wt % of propylene glycol, 10 wt % of black dye SP and balance of deionized water are mixed by stirring at room temperature for 6 hours. After the mixed solution is filtered by a filter membrane, the obtained filtrate is the water-based ink.

Example 3

Based on the total amount of the high resolution water-based ink, 20 wt % of epoxy resin (purchased from Jiangsu Santnu Group with a trademark of E-51), 1 wt % of polyphenylmethylsiloxane (purchased from Alfa Aesar (Tianjin) Chemical Co., Ltd. with a model of MW 2500-2700), 10 wt % of acetonitrile, 0.03 wt % of acidic blue 25, 0.1 wt % of polyether F-68 and balance of deionized water are mixed by stirring at room temperature for 3 hours. After the mixed solution is filtered, the obtained filtrate is the water-based ink.

Example 4

Based on the total amount of the high resolution water-based ink, 30 wt % of water-soluble phenolic resin (purchased from Shandong Shengquan Chemical Co., Ltd. with a trademark of PF-7210), 0.1 wt % of polyether-modified silicone (purchased from Fujian Shishi Luyu Chemical & Trade Co., Ltd. with a trademark of AE 61 CN)), 0.06 wt % of active black, 15 wt % of tetrahydrofuran, 0.5 wt % of higher alcohols (purchased from Liaoyang Huaxing Chemicals Co., Ltd.) and balance of deionized water are mixed by stirring at room temperature for 4 hours. After the mixed solution is filtered, the obtained filtrate is the water-based ink.

Example 5

Based on the total amount of the high resolution water-based ink, 25 wt % of polyvinyl alcohol (purchased from Beijing Zhonghui United New Material Co., Ltd. with a trademark of PVA 17-99), 0.5 wt % of polyester-modified silicone (purchased from Hubei Xinsihai Chemical Co., Ltd. with a trademark of SH-022)), 0.05 wt % of Victoria blue, 2 wt % of 1,4-dioxane, 0.3 wt % of polyester 3050 (purchased from Jiangyin Feiyun Chemical Co., Ltd.) and balance of deionized water are mixed by stirring at room temperature for 3 hours. After the mixed solution is filtered, the obtained filtrate is the water-based ink.

Example 6

Based on the total amount of the high resolution water-based ink, 30 wt % of polyvinyl pyrrolidone (purchased from Sinophann Chemical Agent Beijing Co., Ltd with a trademark of PVP K30), 0.01 wt % of polyether-modified silicone (purchased from BYK Chemie with a trademark of BYK-306), 1 wt % of dye acidic yellow 23 SF, 3 wt % of dimethylsulfoxide, 1 wt % of polyether L-64 (purchased from Jiangsu Haian Petrochemical Factory) and balance of deionized water are mixed by stirring at room temperature for 2 hours. After the mixed solution is filtered, the obtained filtrate is the water-based ink.

Example 7

Based on the total amount of the high resolution water-based ink, 10 wt % of polyethylene glycol (purchased from Sinopharm Chemical Agent Beijing Co., Ltd with a trademark of PEG-400), 0.05 wt % of fluorine-containing acrylic resin (purchased from Shanghai Weathercock Chemistry Science Co., Ltd. with a trademark of FB8700), 0.5 wt % of basic brilliant blue, 10 wt % of N,N-dimethylformamide, 2 wt % of polyether 3010 (purchased from Dow Chemical Company) and balance of deionized water are mixed by stirring at room temperature for 5 hours. After the mixed solution is filtered, the obtained filtrate is the water-based ink.

Example 8

Based on the total amount of the high resolution water-based ink, 25 wt % of gelatine (purchased from Sinopharm Chemical Agent Beijing Co., Ltd.), 0.01 wt % of fluorine-containing acrylic resin (purchased from Shanghai Weathercock Chemistry Science Co., Ltd. with a trademark of FB8700), 0.02 wt % of acidic blue 40, 1 wt % of ethylene glycol mono-n-butyl ether, 0.5 wt % of natural oils and balance of deionized water are mixed by stirring at room temperature for 4 hours. After the mixed solution is filtered, the obtained filtrate is the water-based ink.

Example 9

Based on the total amount of the high resolution water-based ink, 30 wt % of gum arabic (purchased from Sinopharm Chemical Agent Beijing Co., Ltd), 1 wt % of fluorine-containing polyether (purchased from BYK Chemie with a trademark of BYK-340), 10 wt % of dye acidic blue 9, 6 wt % of diethylene glycol monomethyl ether and balance of deionized water are mixed by stirring at room temperature for 4 hours. After the mixed solution is filtered, the obtained filtrate is the water-based ink.

Example 10

Based on the total amount of the high resolution water-based ink, 20 wt % of polyacrylic resin (purchased from Zibo Fengyuan Chemical Co., Ltd. with a trademark of ZB-25), 0.1 wt % of fluorine-containing acrylic resin (purchased from Shanghai Weathercock Chemistry Science Co. Ltd. with a trademark of FB8700), 0.6 wt % of pigment brown (with a particle size of 500 nm), 15 wt % of ethanol, 0.1 wt % of polyether F-38 (purchased from Jiangsu Haim Petrochemical Co., Ltd.) and balance of deionized water are mixed by stirring at room temperature for 5 hours. After the mixed solution is filtered, the obtained filtrate is the water-based ink.

Example 11

Based on the total amount of the high resolution water-based ink, 35 wt % of alkyd resin (purchased from Beijing Kunqi Weijie Industry & Trade Co., Ltd with a trademark of SY3898), 0.5 wt % of polyether-modified polydimethylsiloxane (purchased from BYK Chemie with a trademark of BYK-331), 0.25 wt % of basic brilliant blue, 30 wt % of diethylene glycol monobutyl ether and balance of deionized water are mixed by stirring at room temperature for 5 hours. After the mixed solution is filtered, the obtained filtrate is the water-based ink.

Example 12

Based on the total amount of the high resolution water-based ink, 30 wt % of polymethacrylic acid resin (purchased from Jinan Yuanxiang Chemical Co., Ltd. with a trademark of BC-210-805), 1 wt % of polymethylphenylsiloxane (purchased from AlfaAesar (Tianjin) Chemical Co., Ltd. with a trademark of MW 2500-2700), 0.2 wt % of pigment black (with a particle size of 100 nm), 8 wt % of dipropylene glycol dimethyl ether, 0.02 wt % of higher alcohols (purchased from Liaoyang Huaxing Chemicals Co., Ltd.) and balance of deionized water are mixed by stirring at room temperature for 5 hours. After the mixed solution is filtered, the obtained filtrate is the water-based ink.

Example 13

Based on the total amount of the high resolution water-based ink, 25 wt % of random copolymer of acrylic acid and methyl acrylate (based on the total amount of the structural unit formed by acrylic acid and the structural unit formed by methyl acrylate, the content of the structural unit formed by acrylic acid is 6.25 wt %), 3 wt % of polydimethylsiloxane (purchased from Guangzhou Silok Chemical Co., Ltd. with a trademark of Silok 201-100), 0.3 wt % of basic brilliant blue, 20 wt % of diethylene glycol dimethyl ether, 0.03 wt % of polyether P-65 (purchased from Jiangsu Haian Petrochemical Co., Ltd.) and balance of deionized water are mixed by stirring at room temperature for 5 hours. After the mixed solution is filtered, the obtained filtrate is the water-based ink.

Example 14

Based on the total amount of the high resolution water-based ink, 15 wt % of random copolymer of methacrylic acid and methyl methacrylate (based on the total amount of the structural unit formed by methacrylic acid and the structural unit formed by methyl methacrylate, the content of the structural unit formed by methacrylic acid is 50 wt %), 5 wt % of polyether-modified silicone (purchased from Fujian Shishi Luyu Chemical & Trade Co., Ltd. with a trademark of AE 61 CN)), 0.5 wt % of pigment blue (with a particle size of 1000 nm), 5 wt % of diethylene glycol monomethyl ether, 0.06 wt % of polyether 204 (purchased from Jiangsu Haian Petrochemical Co., Ltd.) and balance of deionized water are mixed by stirring at room temperature for 5 hours. After the mixed solution is filtered, the obtained filtrate is the water-based ink.

Example 15

Based on the total amount of the high resolution water-based ink, 10 wt % of polyvinyl butyral (purchased from Sinopharm Chemical Agent Beijing Co., Ltd with a viscosity of 100-120 s at 25° C. measured by a Tu-4 viscometer according to the method specified in GB/T1723-93), 0.2 wt % of polyester-modified silicone (purchased from Hubei Xinsihai Chemical Co., Ltd. with a trademark of SH-022), 0.4 wt % of pigment yellow (with a particle size of 5 nm), 15 wt % of propylene glycol monobutyl ether and balance of deionized water are mixed by stirring at room temperature for 5 hours. After the mixed solution is filtered, the obtained filtrate is the water-based ink.

Example 16

Based on the total amount of the high resolution water-based ink, 5 wt % of water-soluble cellulose (purchased from Luzhou Tongyi Science Chemical Co., Ltd. with a trademark of EK-70), 0.02 wt % of polyether-modified polydimethylsiloxane (purchased from BYK Chemie with a trademark of BYK-331), 0.5 wt % of basic brilliant blue, 20 wt % of n-butanol and balance of deionized water are mixed by stirring at room temperature for 5 hours. After the mixed solution is filtered, the obtained filtrate is the water-based ink.

Example 17

Based on the total amount of the high resolution water-based ink, 10 wt % of water-soluble phenolic resin (purchased from Shandong Shengquan Chemical Co., Ltd. with a trademark of PE-7210), 10 wt % of epoxy resin (purchased from Zhongshan Sanxiang Town Borui Resin Material Trading Company with a trademark of 815). 0.06 wt % of polyether-modified polydimethylsiloxane (purchased from BYK Chemie with a trademark of BYK-331), 1 wt % of acidic blue 62, 10 wt % of ethylene glycol monoethyl ether and balance of deionized water are mixed by stirring at room temperature for 3 hours. After the mixed solution is filtered, the obtained filtrate is the water-based ink.

Example 18

Based on the total amount of the high resolution water-based ink, 5 wt % of epoxy resin (purchased from Jiangsu Sanmu Group with a trademark of E-51), 25 wt % of polyurethane resin (purchased from Yantai Wanhua Polyurethane Co., Ltd with a trademark of WANNATE PM-2025), 0.05 wt % of fluorine-containing acrylic resin (purchased from Shanghai Weathercock Chemistry Science Co., Ltd. with a trademark of FB8700), 10 wt % of acidic blue 324, 2 wt % of propylene glycol monomethyl ether, 0.01 wt % of natural oils and balance of deionized water are mixed by stirring at room temperature for 4 hours. After the mixed solution is filtered, the obtained filtrate is the water-based ink.

Example 19

Based on the total amount of the high resolution water-based ink, 10 wt % of water-soluble phenolic resin (purchased from Shandong Shengquan Chemical Co., Ltd. with a trademark of PF-7210), 15 wt % of polyvinyl pyrrolidone (purchased from Sinopharm Chemical Agent Beijing Co., Ltd with a trademark of PVP K30), 0.01 wt % of polydimethylsiloxane (purchased from Guangzhou Silok Chemical Co., Ltd. with a trademark of Silok® 201-100), 0.12 wt % of acidic blue AS, 15 wt % of diethylene glycol and balance of deionized water are mixed by stirring at room temperature for 5 hours. After the mixed solution is filtered, the obtained filtrate is the water-based ink.

Example 20

Based on the total amount of the high resolution water-based ink, 25 wt % of epoxy resin (purchased from Jiangsu Sanmu Group with a trademark of E-51), 5 wt % of polyethylene glycol (purchased from Sinopharm Chemical Agent Beijing Co., Ltd with a trademark of PEG-400), 10 wt % of polyether-modified silicone (purchased from Fujian Shishi Luyu Chemical & Trade Co., Ltd. with a trademark of AE 61 CN), 1 wt % of dye acidic yellow 23 SF, 1 wt % of triethylene glycol, 2 wt % of polyether L-64 (purchased from Jiangsu Haian Petrochemical Factory) and balance of deionized water are mixed by stirring at room temperature for 4 hours. After the mixed solution is filtered, the obtained filtrate is the water-based ink.

Example 21

Based on the total amount of the high resolution water-based ink, 30 wt % of polyurethane resin (purchased from Yantai Wanhua Polyurethane Co., Ltd with a trademark of WANNATE PM-2025), 10 wt % of water-soluble cellulose (purchased from Luzhou Tongyi Science Chemical Co., Ltd. with a trademark of EK-70), 1 wt % of polyphenylmethylsiloxane (purchased from Alfa Aesar (Tianjin) Chemical Co., Ltd. with a trademark of MW 2500-2700), 5 wt % of acidic blue AGG, 8 wt % of ethanol, 0.05 wt % of polyether F-38 (purchased from Jiangsu Haian Petrochemical Factory) and balance of deionized water are mixed by stirring at room temperature for 2 hours. After the mixed solution is filtered, the obtained filtrate is the water-based ink.

Example 22

Based on the total amount of the high resolution water-based ink, 5 wt % of water-soluble phenolic resin (purchased from Shandong Shengquan Chemical Co., Ltd. with a trademark of PF-7210), 20 wt % of poly-urethane Resin (purchased from Anping Sanlian Filtration Equipment Co., Ltd. with a trademark of 100), 0.5 wt % of polyether-modified polydimethylsiloxane (purchased from BYK Chemie with a trademark of BYK-331), 0.01 wt % of acidic blue 2BR, 15 wt % of isopropanol, 0.4 wt % of higher alcohols (purchased from Liaoyang Huaxing Chemical Co., Ltd.) and balance of deionized water are mixed by stirring at room temperature for 4 hours. After the mixed solution is filtered, the obtained filtrate is the water-based ink.

Example 23

Based on the total amount of the high resolution water-based ink, 15 wt % of water-soluble phenolic resin (purchased from Shandong Shengquan Chemical Co., Ltd. with a trademark of PF-7210), 20 wt % of polyurethane resin (purchased from Anping Sanlian Filtration Equipment Co., Ltd. with a trademark of 100), 5 wt % of fluorine-containing acrylic resin (purchased from Shanghai Weathercock Chemistry Science Co., Ltd. with a trademark of FB8700), 0.8 wt % of acidic blue BR, 10 wt % of isopropanol and balance of deionized water are mixed by stirring at room temperature for 4 hours. After the mixed solution is filtered, the obtained filtrate is the water-based ink.

In Examples 10 to 20, the filter adopts multi-stage filter. Specifically, the glass sand core funnel with a pore size of 20-30 microns (G1-type glass sand core funnel) is firstly adopted to filter the mixed solution, and then the glass sand core funnel with a pore size of 3-4 microns (G4-type glass sand core funnel) is further adopted to filter the mixed solution, and then a polytetrafluoroethylene micro-porous membrane with a pore size of 0.3-0.5 micron is adopted to filter the mixed solution, finally a polytetrafluoroethylene micro-porous membrane with a pore size of 0.15-0.25 micron is further adopted to filter the mixed solution. In Examples 1-9 and 21-23, the filter is performed by a glass sand core funnel with a pore size of 3-4 microns (G4-type glass sand core funnel).

The conductivity of the deionized water in Examples 1-23 is less than 10 micro Siemens/cm. The prepared water-based ink for computer-to-plate inkjet printing is respectively sprayed onto the metal substrate (aluminum substrate, zinc substrate or copper substrate) for plate making by an inkjet printer to form a graphic region. After curing, the printing plate allowing for computer-to-plate inkjet printing is achieved. The obtained printing plate is good in resolution, and can achieve a halftone dot reproduction rate between 2 and 99% and a resolution of 175 lpi.

What is claimed is:

1. A water-based ink for computer-to-plate inkjet printing, wherein based on total amount of the water-based ink, the water-based ink consists of:
    5-40 wt % of a polymer,
    0.01-10 wt % of an additive,
    0.01-10 wt % of dye or pigment,
    1 to 30 wt % of organic solvent,
    0-5 wt % of anti-foaming agent, and
    balance of deionized water;
    the polymer is at least one selected from the group consisting of epoxy resin, water-soluble phenolic resin, polyvinyl alcohol, polyvinyl pyrrolidone, polyethylene glycol, gelatin, gum arabic, polyacrylic acid resin, alkyd resin, polymethacrylic acid resin, copolymer of acrylic acid and acrylate-based monomer, copolymer of methacrylic acid and methacrylate-based monomer, polyvinyl acetal and water-soluble cellulose;
    the additive is selected from organic silicone-based leveling agent and/or organic fluorine-based leveling agent, the organic silicone-based leveling agent is at least one selected from the group consisting of polydimethylsiloxane, polyphenylmethylsiloxane and polyester-modified silicone; the organic fluorine-based leveling agent is at least one selected from the group consisting of fluorine-containing acrylic resin;
    the anti-foaming agent is at least one selected from the group consisting of nature oils, polyether and higher alcohols.

2. The water-based ink for computer-to-plate inkjet printing according to claim 1, wherein the acrylate-based monomer is at least one selected from the group consisting of methyl acrylate, ethyl acrylate, propyl acrylate, n-butyl acrylate, lauryl acrylate, octadecyl acrylate and 2-ethyl hexyl acrylate;
    the methacrylate-based monomer is at least one selected from the group consisting of methyl methacrylate, butyl methacrylate, 2-phenoxy ethyl methacrylate and glycidyl methacrylate.

3. The water-based ink for computer-to-plate inkjet printing according to claim 1, wherein the dye is one selected from the group consisting of active dye, acidic dye and basic dye; the pigment has a particle size of 5-1000 nm; the pigment is one selected from the group consisting of pigment yellow, pigment orange, pigment red, pigment purple, pigment blue, pigment green, pigment brown, pigment black, pigment white and metal pigment.

4. The water-based ink for computer-to-plate inkjet printing according to claim 3, wherein the active dye is one selected from the group consisting of black dye SP series and active black;
the acidic dye is one selected from the group consisting of dye acidic blue and dye acidic yellow;
the basic dye is one selected from the group consisting of basic brilliant blue and Victoria blue.

5. The water-based ink for computer-to-plate inkjet printing according to claim 4, wherein the dye acidic blue is one selected from the group consisting of acidic blue 9, acidic blue 25, acidic blue 40, acidic blue 62, acidic blue 324, acidic blue AS, acidic blue AGG, acidic blue 2BR and acidic blue BR;
the dye acidic yellow is one selected from the group consisting of dye acidic yellow 3, dye acidic yellow 23, dye acidic yellow 49, dye acidic yellow 127 and dye acidic yellow 6G.

6. The water-based ink for computer-to-plate inkjet printing according to claim 1, wherein the organic solvent is at least one selected from the group consisting of ethanol, propanol, isopropanol, n-butanol, tent-butanol, acetonitrile, tetrahydrofuran, 1, 4-dioxane, dimethylsulfoxide, N, N-dimethylformamide, ethylene glycol ethyl ether, propylene glycol methyl ether, propylene glycol ethyl ether, diethylene glycol methyl ether, ethylene glycol mono-n-butyl ether, ethylene glycol dimethyl ether, propylene glycol isopropyl ether, propylene glycol monobutyl ether, propylene glycol dibutyl ether, diethylene glycol monoethyl ether, diethylene glycol dimethyl ether, diethylene glycol monobutyl ether, dipropylene glycol monomethyl ether, dipropylene glycol dimethyl ether, dipropylene glycol diethyl ether, dipropylene glycol dipropyl ether, dipropylene glycol monoethyl ether, dipropylene glycol monobutyl ether, triethylene glycol monoethyl ether, triethylene glycol monobutyl ether, tripropylene glycol monomethyl ether, ethylene glycol, propylene glycol, glycerol, diethylene glycol and triethylene glycol.

7. The water-based ink for computer-to-plate inkjet printing according to claim 1, wherein the conductivity of the deionized water is less than 10 micro Siemens/cm.

8. A method for preparing the water-based ink for computer-to-plate inkjet printing, based on the total amount of the water-based ink, wherein the method comprises the following steps: mixing 5-40 wt % of polymer, 0.01 to 10 wt % of additive, 0.01 to 10 wt % of dye or pigment, 1 to 30 wt % of organic solvent, 0 to 5 wt % of anti-foaming agent, and balance of deionized water by stirring at room temperature, when the polymer is completely dissolved, filtering the mixed solution, and obtaining filtrate as the water-based ink for computer-to-plate inkjet printing,
the polymer is at least one selected from the group consisting of, epoxy resin, water-soluble phenolic resin, polyvinyl alcohol, polyvinyl pyrrolidone, polyethylene glycol, gelatin, gum arabic, polyacrylic acid resin, alkyd resin, polymethacrylic acid resin, copolymer of acrylic acid and acrylate-based monomer, copolymer of methacrylic acid and methacrylate-based monomer, polyvinyl acetal and water soluble cellulose;
the additive is selected from organic silicone-based leveling agent and/or organic fluorine-based leveling agent, the organic silicone-based leveling agent is at least one selected from the group consisting of polvdimethvlsiloxane, polyphenylmethylsiloxane and polyester-modified silicone; the organic fluorine-based leveling agent is at least one selected from the group consisting of fluorine-containing acrylic resin;
the anti-foaming agent is at least one selected from the group consisting of nature oils, polyether and higher alcohols.

9. The method according to claim 8, wherein the acrylate-based monomer is at least one selected from the group consisting of methyl acrylate, ethyl acrylate, propyl acrylate, n-butyl acrylate, lauryl acrylate, octadecyl acrylate and 2-ethyl hexyl acrylate;
the methacrylate-based monomer is at least one selected from the group consisting of methyl methacrylate, butyl methacrylate, 2-phenoxy ethyl methacrylate and glycidyl methacrylate.

10. The method according to claim 8, wherein the dye is one selected from the group consisting of active dye, acidic dye and basic dye;
the pigment has a particle size of 5-1000 nm; the pigment is one selected from the group consisting of pigment yellow, pigment orange, pigment red, pigment purple, pigment blue, pigment green, pigment brown, pigment black, pigment white and metal pigment.

11. The method according to claim 10, wherein the active dye is one selected from the group consisting of black dye SP series and active black;
the acidic dye is one selected from the group consisting of dye acidic blue and dye acidic yellow;
the basic dye is one selected from the group consisting of basic brilliant blue and Victoria blue.

12. The method according to claim 11, wherein the dye acidic blue is one selected from the group consisting of acidic blue 9, acidic blue 25, acidic blue 40, acidic blue 62, acidic blue 324, acidic blue AS, acidic blue AGG, acidic blue 2BR and acidic blue BR;
the dye acidic yellow is one selected from the group consisting of dye acidic yellow 3, dye acidic yellow 23, dye acidic yellow 49, dye acidic yellow 127 and dye acidic yellow 6G.

13. The method according to claim 8, wherein the organic solvent is at least one selected from the group consisting of ethanol, propanol, isopropanol, n-butanol, tent-butanol, acetonitrile, tetrahydrofuran, 1, 4-dioxane, dimethylsulfoxide, N, N-dimethylformamide, ethylene glycol ethyl ether, propylene glycol methyl ether, propylene glycol ethyl ether, diethylene glycol methyl ether, ethylene glycol mono-n-butyl ether, ethylene glycol dimethyl ether, propylene glycol isopropyl ether, propylene glycol monobutyl ether, propylene glycol dibutyl ether, diethylene glycol monoethyl ether, diethylene glycol dimethyl ether, diethylene glycol monobutyl ether, dipropylene glycol monomethyl ether, dipropylene glycol dimethyl ether, dipropylene glycol diethyl ether, dipropylene glycol dipropyl ether, dipropylene glycol monoethyl ether, dipropylene glycol monobutyl ether, triethylene glycol monoethyl ether, triethylene glycol monobutyl ether, tripropylene glycol monomethyl ether, ethylene glycol, propylene glycol, glycerol, diethylene glycol and triethylene glycol.

14. The method according to claim 8, wherein the conductivity of the deionized water is less than 10 micro Siemens/cm.

* * * * *